(12) United States Patent
Lavelle et al.

(10) Patent No.: US 7,027,064 B2
(45) Date of Patent: Apr. 11, 2006

(54) ACTIVE BLOCK WRITE-BACK FROM SRAM CACHE TO DRAM

(75) Inventors: Michael G. Lavelle, Saratoga, CA (US); Ewa M. Kubalska, San Jose, CA (US); Yan Yan Tang, Mountain View, CA (US)

(73) Assignee: Sun Microsystems, Inc., Santa Clara, CA (US)

( * ) Notice: Subject to any disclaimer, the term of this patent is extended or adjusted under 35 U.S.C. 154(b) by 160 days.

(21) Appl. No.: 10/086,174

(22) Filed: Feb. 28, 2002

(65) Prior Publication Data

US 2003/0160796 A1     Aug. 28, 2003

(51) Int. Cl.
*G09G 5/36* (2006.01)
*G06F 13/00* (2006.01)
*G06F 12/00* (2006.01)

(52) U.S. Cl. ............ 345/557; 345/537; 711/122; 711/133

(58) Field of Classification Search ........ 345/503, 345/519, 531, 537, 543, 545, 557, 556, 536; 711/122, 133, 136, 143
See application file for complete search history.

(56) References Cited

U.S. PATENT DOCUMENTS

| 4,092,713 | A | * | 5/1978 | Scheuneman | 714/53 |
|---|---|---|---|---|---|
| 5,544,306 | A | * | 8/1996 | Deering et al. | 345/545 |
| 5,579,473 | A | * | 11/1996 | Schlapp et al. | 345/557 |
| 5,767,865 | A | * | 6/1998 | Inoue et al. | 345/519 |
| 5,787,473 | A | * | 7/1998 | Vishlitzky et al. | 711/134 |
| 5,796,980 | A | * | 8/1998 | Bowles | 711/144 |
| 5,860,086 | A | * | 1/1999 | Crump et al. | 711/109 |
| 5,918,245 | A | * | 6/1999 | Yung | 711/122 |
| 5,991,865 | A | * | 11/1999 | Longhenry et al. | 712/7 |
| 6,000,017 | A | * | 12/1999 | Hayek et al. | 711/144 |
| 6,119,205 | A | * | 9/2000 | Wicki et al. | 711/143 |
| 6,339,818 | B1 | * | 1/2002 | Olszewski et al. | 711/173 |
| 6,415,358 | B1 | * | 7/2002 | Arimilli et al. | 711/134 |
| 6,437,789 | B1 | * | 8/2002 | Tidwell et al. | 345/557 |
| 6,490,655 | B1 | * | 12/2002 | Kershaw | 711/133 |
| 6,535,218 | B1 | * | 3/2003 | Schlapp | 345/545 |
| 6,667,744 | B1 | * | 12/2003 | Buckelew et al. | 345/502 |
| 6,697,918 | B1 | * | 2/2004 | Rowlands | 711/133 |
| 6,715,040 | B1 | * | 3/2004 | Wang et al. | 711/133 |
| 6,720,969 | B1 | | 4/2004 | Lavelle et al. | |
| 2003/0070044 | A1 | * | 4/2003 | Jeddeloh | 711/118 |
| 2003/0093744 | A1 | * | 5/2003 | Leung et al. | 714/763 |

* cited by examiner

*Primary Examiner*—Kee M. Tung
(74) *Attorney, Agent, or Firm*—Meyertons Hood Kivlin Kowert & Goetzel, P.C.; Jeffrey C. Hood

(57) ABSTRACT

An external cache management unit for use with 3D-RAM and suitable for use in a computer graphics system is described. The unit maintains and tracks the status of level one cache memory in the 3D-RAM. The unit identifies dirty blocks of cache memory and prioritizes block cleansing based on a least used algorithm. Periodic block cleansing during empty memory cycles is provided for, and may also be prompted on demand.

20 Claims, 13 Drawing Sheets

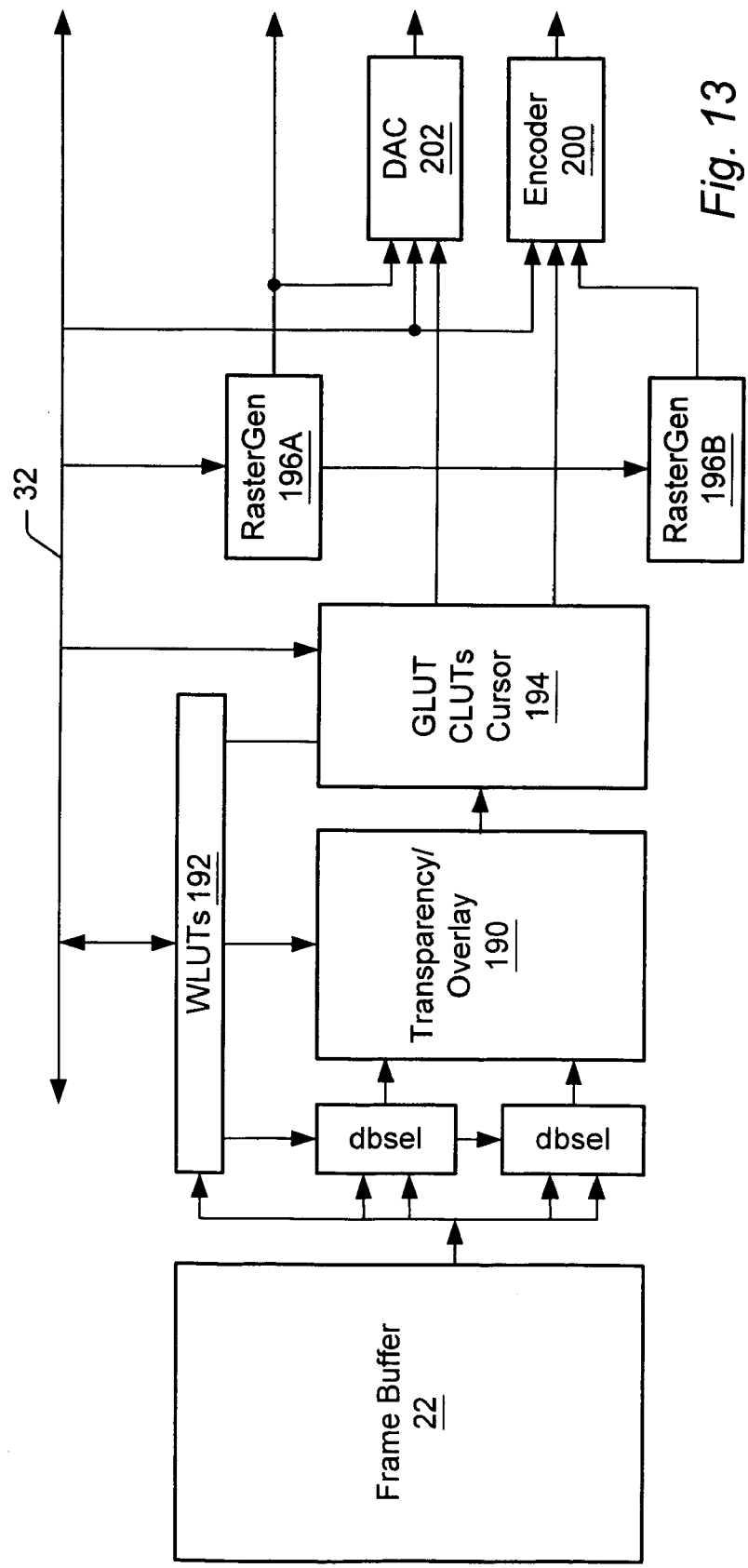

ACTIVE BLOCK WRITE-BACK FROM SRAM CACHE TO DRAM

BACKGROUND OF THE INVENTION

1. Field of the Invention

This invention relates generally to the field of computer graphics and, more particularly, to graphics frame buffer architecture.

2. Description of the Related Art

With each new generation of graphics system, there is more image data to process and less time in which to process it. This consistent increase in data and data rates places additional burden on the memory systems that form an integral part of the graphics system. Attempts to further improve graphics system performance are now running up against the limitations of these memory systems in general, and memory device limitations in particular.

In order to provide memory systems with increased data handling rates and capacities, system architects may employ consistently higher levels of integration. One example of increased integration is the 3D-RAM family of memories from the Mitsubishi Corporation. The 3D-RAM incorporates four banks of DRAM main storage with level one and level two cache memories, and a bank-swapped shift register capable of providing an uninterrupted stream of sequential data at current pixel clock speeds.

Some previous incarnations of the 3D-RAM architecture have included cache management functions as well. In these older devices, circuitry was integrated to allow for the efficient write-back of modified or "dirty" data in the level one cache to the level two cache, and ultimately back to the DRAM. However, as these devices have grown in capacity and performance, it has become increasingly difficult and costly to integrate these cache management functions. In the most recent 3D-RAM device, the 3D-RAM64 these cache management functions have been abandoned altogether having finally become economically infeasible. Despite exclusion from the 3D-RAM devices, these cache management functions are still desirable as they may significantly increase memory performance by mitigating the penalties associated with level one cache misses. For these reasons, a system and method for externally managing the cache memory of 3D-RAM devices employed in graphics systems is desired.

SUMMARY OF THE INVENTION

The problems set forth above may at least in part be solved in some embodiments by a system or method for managing a 3D-RAM cache through the employment of external dirty tag bits and LRU (i.e., least recently used) registers. In one embodiment, the system may include a memory array of 3D-RAM devices configured to receive and store pixel data. A memory request processor may be connected to the memory and may be configured to maintain an array of dirty tag bits (i.e., setting and clearing the logic state of the dirty tag bits in response to cache requests and pixel write operations) and a list of LRU registers. The level one cache of the 3D-RAM may be divided into logical blocks, with one dirty tag bit and one LRU register associated with each block. The memory request processor may be further configured to periodically synchronize the pixel data in the 3D-RAM level two and level one caches by commanding level one cache write-backs of blocks according to the contents of the LRU registers and dirty tag bits.

As noted above, a method for managing 3D-RAM cache through the employment of external dirty tag bits and LRU registers is also contemplated. In one embodiment, the method includes maintaining a set of LRU registers as a part of processing external accesses to the level one cache. The contents of the LRU registers may be used to order the blocks according to recent accesses (i.e., the block or blocks identified as being least recently used are given block cleansing priority). The dirty tag bits may be maintained as a part of processing external writes to the level one cache, and as a part of processing internal cache to cache block transfers. Periodically the blocks may be examined in the order suggested by the LRU registers. Next, blocks indicated by the associated dirty tag bits as dirty may be cleansed by writing-back the blocks to the level two cache during the next empty memory cycle. Next, the dirty tag bits associated with the transferred blocks are returned to a state indicating the blocks are clean, and available for allocation.

In one embodiment, the cache management system may be integrated into a graphics system suitable for creating and displaying graphic images. In other embodiments, the system may be part of an optional assembly, communicating with a host graphics system through the use of a data or control bus specific to the host.

BRIEF DESCRIPTION OF THE DRAWINGS

The foregoing, as well as other objects, features, and advantages of this invention may be more completely understood by reference to the following detailed description when read together with the accompanying drawings in which:

FIG. 13 is a functional block diagram of one embodiment of the video output processor of FIG. 3.

Figure 1:
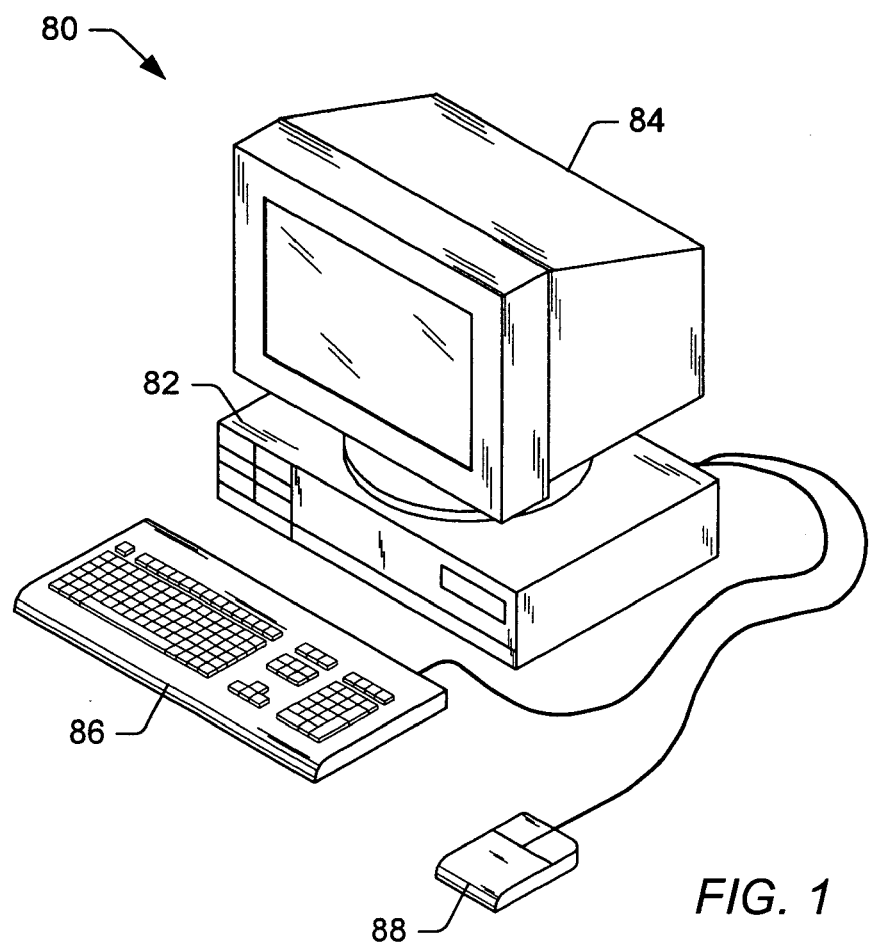
FIG. 1 is a perspective view of one embodiment of a computer system.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents, and alternatives falling within the spirit and scope of the present invention as defined by the appended claims. Please note that the section headings used herein are for organizational purposes only and are not meant to limit the description or claims. The word "may" is used in this application in a permissive sense (i.e., having the potential to, being able to), not a mandatory sense (i.e., must). Similarly, the word include, and derivations thereof, are used herein to mean "including, but not limited to."

DETAILED DESCRIPTION OF THE PREFERRED EMBODIMENTS

Computer System—FIG. 1

Referring now to FIG. 1, one embodiment of a computer system 80 that includes a graphics system that may be used to implement one embodiment of the invention is shown. The graphics system may be comprised in any of various systems, including a computer system, network PC, Internet appliance, a television, including HDTV systems and interactive television systems, personal digital assistants (PDAs), virtual reality systems, and other devices which display 2D and or 3D graphics, among others.

As shown, the computer system 80 comprises a system unit 82 and a video monitor or display device 84 coupled to the system unit 82. The display device 84 may be any of various types of display monitors or devices (e.g., a CRT, LCD, or gas-plasma display). Various input devices may be connected to the computer system, including a keyboard 86 and/or a mouse 88, or other input device (e.g., a trackball, digitizer, tablet, six-degree of freedom input device, head tracker, eye tracker, data glove, or body sensors). Application software may be executed by the computer system 80 to display graphical objects on display device 84.

Figure 2:
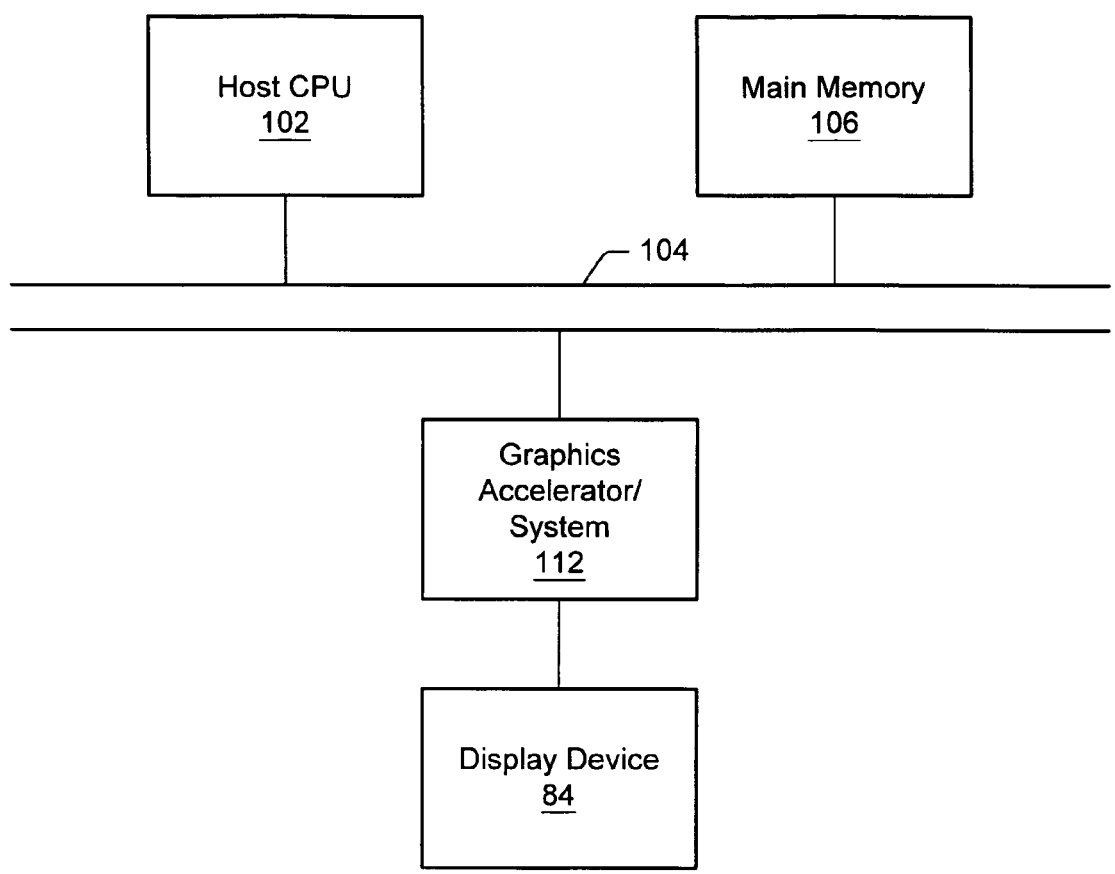
FIG. 2 is a simplified block diagram of one embodiment of a computer system.

Computer System Block Diagram—FIG. 2

Referring now to FIG. 2, a simplified block diagram illustrating the computer system of FIG. 1 is shown. Elements of the computer system that are not necessary for an understanding of the present invention are not shown for convenience. As shown, the computer system 80 includes a central processing unit (CPU) 102 coupled to a high-speed memory bus or system bus 104 also referred to as the host bus 104. A system memory 106 may also be coupled to high-speed bus 104.

Host processor 102 may comprise one or more processors of varying types, e.g., microprocessors, multi-processors and CPUs. The system memory 106 may comprise any combination of different types of memory subsystems, including random access memories, (e.g., static random access memories or "SRAMs," synchronous dynamic random access memories or "SDRAMs," and Rambus dynamic random access memories or "RDRAM," among others) and mass storage devices. The system bus or host bus 104 may comprise one or more communication or host computer buses (for communication between host processors, CPUs, and memory subsystems) as well as specialized subsystem buses.

In FIG. 2, a graphics system 112 is coupled to the high-speed memory bus 104. The 3-D graphics system 112 may be coupled to the bus 104 by, for example, a crossbar switch or other bus connectivity logic. It is assumed that various other peripheral devices, or other buses, may be connected to the high-speed memory bus 104. It is noted that the graphics system may be coupled to one or more of the buses in computer system 80 and/or may be coupled to various types of buses. In addition, the graphics system may be coupled to a communication port and thereby directly receive graphics data from an external source, e.g., the Internet or a network. As shown in the figure, one or more display devices 84 may be connected to the graphics system 112 comprised in the computer system 80.

Host CPU 102 may transfer information to and from the graphics system 112 according to a programmed input/output (I/O) protocol over host bus 104. Alternately, graphics system 112 may access the memory subsystem 106 according to a direct memory access (DMA) protocol or through intelligent bus mastering.

A graphics application program conforming to an application programming interface (API) such as OpenGL or Java 3D may execute on host CPU 102 and generate commands and data that define a geometric primitive (graphics data) such as a polygon for output on display device 84. As defined by the particular graphics interface used, these primitives may have separate color properties for the front and back surfaces. Host processor 102 may transfer this graphics data to memory subsystem 106. Thereafter, the host processor 102 may operate to transfer the graphics data to the graphics system 112 over the host bus 104. In another embodiment, the graphics system 112 may read in geometry data arrays over the host bus 104 using DMA access cycles. In yet another embodiment, the graphics system 112 may be coupled to the system memory 106 through a direct port, such as the Advanced Graphics Port (AGP) promulgated by Intel Corporation.

The graphics system may receive graphics data from any of various sources, including the host CPU 102 and/or the system memory 106, other memory, or from an external source such as a network, e.g., the Internet, or from a broadcast medium, e.g., television, or from other sources.

Note while graphics system 112 is depicted as part of computer system 80, graphics system 112 may also be configured as a stand-alone device (e.g., with its own built-in display). Graphics system 112 may also be configured as a single chip device or as part of a system-on-a-chip or a multi-chip module. Additionally, in some embodiments, certain elements of the illustrated graphics system 112 may be implemented in software.

Figure 3:
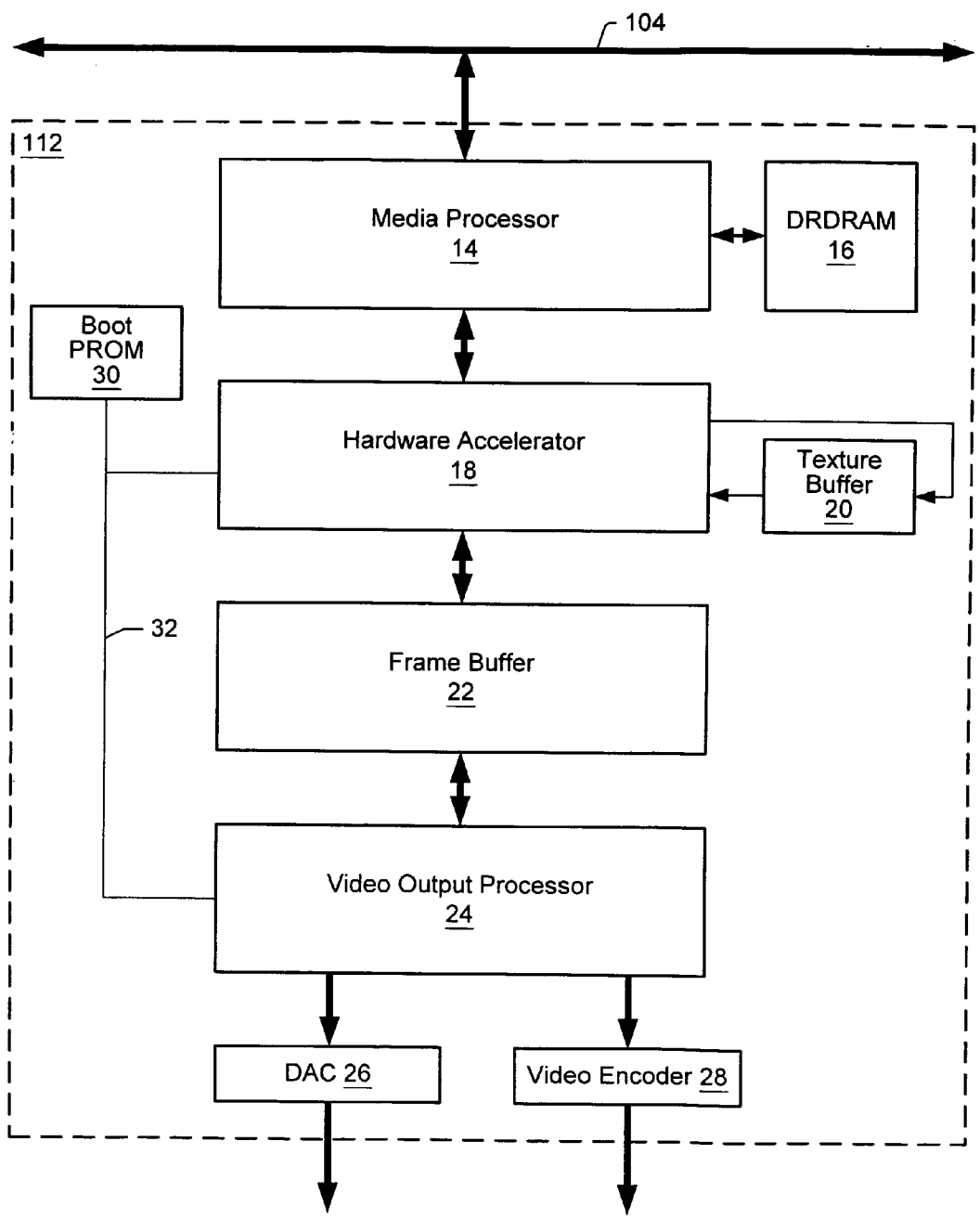
FIG. 3 is a functional block diagram of one embodiment of a graphics system.

Graphics System—FIG. 3

Referring now to FIG. 3, a functional block diagram illustrating one embodiment of graphics system 112 is shown. Note that many other embodiments of graphics system 112 are possible and contemplated. Graphics system 112 may comprise one or more media processors 14, one or more hardware accelerators 18, one or more texture buffers 20, one or more frame buffers 22, and one or more video output processors 24. Graphics system 112 may also comprise one or more output devices such as digital-to-analog converters (DACs) 26, video encoders 28, flat-panel-display drivers (not shown), and/or video projectors (not shown). Media processor 14 and/or hardware accelerator 18 may be any suitable type of high performance processor (e.g., specialized graphics processors or calculation units, multimedia processors, DSPs, or general purpose processors).

In some embodiments, one or more of these components may be removed. For example, the texture buffer may not be included in an embodiment that does not provide texture mapping. In other embodiments, all or part of the functionality implemented in either or both of the media processor or the graphics accelerator may be implemented in software.

In some embodiments, media processor 14 and hardware accelerator 18 may be comprised within the same integrated circuit. In other embodiments, portions of media processor 14 and/or hardware accelerator 18 may be comprised within separate integrated circuits.

As shown, graphics system 112 may include an interface to a host bus such as host bus 104 in FIG. 2 to enable graphics system 112 to communicate with a host system such as computer system 80. More particularly, host bus 104 may allow a host processor to send commands to the graphics system 112. In one embodiment, host bus 104 may be a bi-directional bus.

Each functional block of graphics system 112 is described in more detail below.

Figure 4:
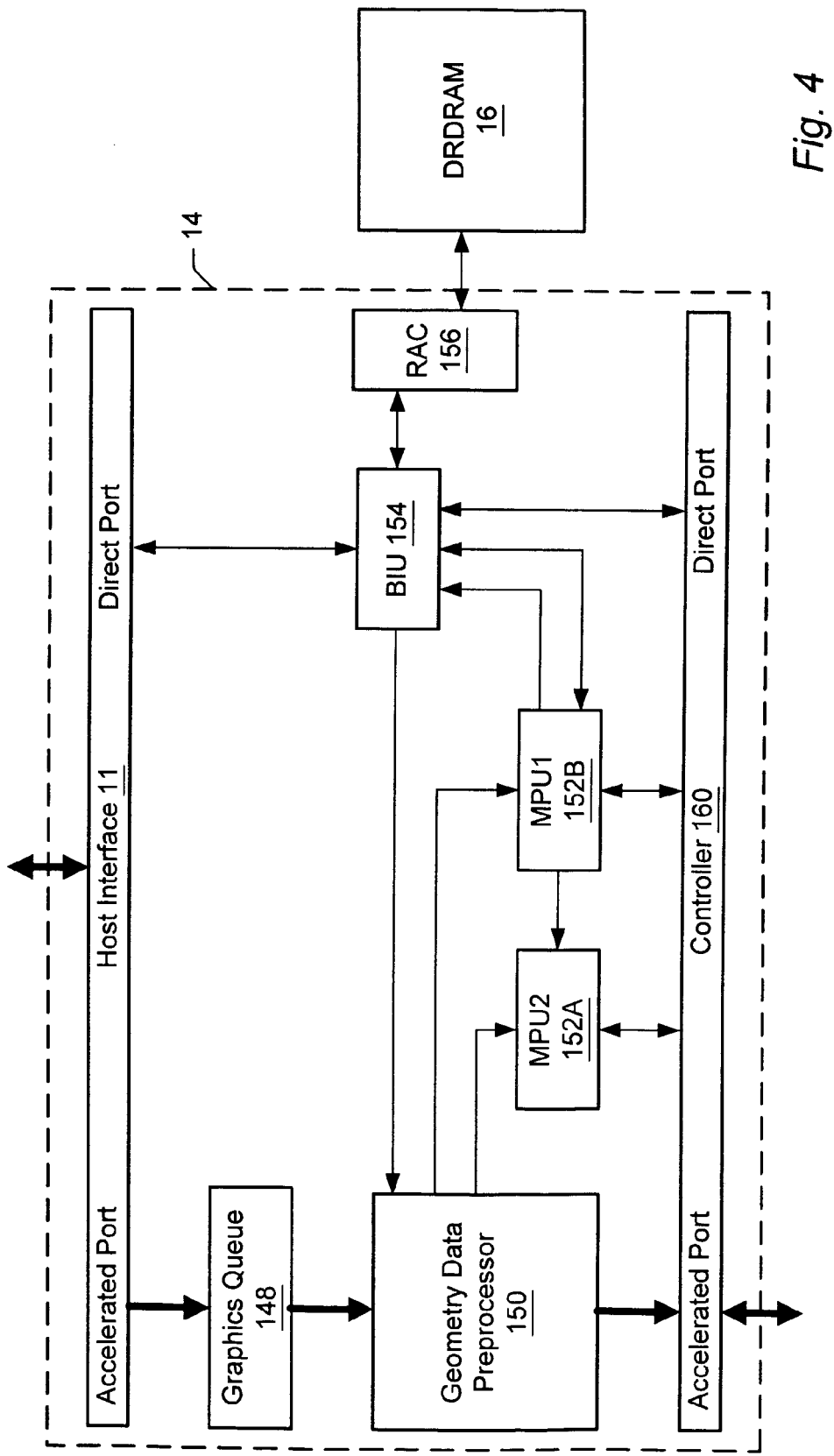
FIG. 4 is a functional block diagram of one embodiment of the media processor of FIG. 3.

Media Processor—FIG. 4

FIG. 4 shows one embodiment of media processor 14. As shown, media processor 14 operates as the interface between graphics system 112 and computer system 80 by controlling the transfer of data between graphics system 112 and computer system 80. In some embodiments, media processor 14 may also be configured to perform transform, lighting, and/or other general-purpose processing on graphical data.

Transformation refers to manipulating an object and includes translating the object (i.e., moving the object to a different location), scaling the object (i.e., stretching or shrinking), and rotating the object (e.g., in three-dimensional space, or "3-space").

Lighting refers to calculating the illumination of the objects within the displayed image to determine what color and or brightness each individual object will have. Depending upon the shading algorithm being used (e.g., constant, Gourand, or Phong), lighting may be evaluated at a number of different locations. For example, if constant shading is used (i.e., each pixel of a polygon has the same lighting), then the lighting need only be calculated once per polygon. If Gourand shading is used, then the lighting is calculated once per vertex. Phong shading calculates the lighting on a per-pixel basis.

As illustrated, media processor 14 may be configured to receive graphical data via host interface 11. A graphics queue 148 may be included in media processor 14 to buffer a stream of data received via the accelerated port of host interface 11. The received graphics data may comprise one or more graphics primitives. As used herein, the term graphics primitive may include polygons, parametric surfaces, splines, NURBS (non-uniform rational B-splines), sub-divisions surfaces, fractals, volume primitives, voxels (i.e., three-dimensional pixels), and particle systems. In one embodiment, media processor 14 may also include a geometry data preprocessor 150 and one or more microprocessor units (MPUs) 152. MPUs 152 may be configured to perform vertex transform and lighting calculations and programmable functions and to send results to hardware accelerator 18. MPUs 152 may also have read/write access to texels (i.e. the smallest addressable unit of a texture map, which is used to "wallpaper" a three-dimensional object) and pixels in the hardware accelerator 18. Geometry data preprocessor 150 may be configured to decompress geometry, to convert and format vertex data, to dispatch vertices and instructions to the MPUs 152, and to send vertex and attribute tags or register data to hardware accelerator 18.

As shown, media processor 14 may have other possible interfaces, including an interface to a memory. For example, as shown, media processor 14 may include direct Rambus interface 156 to a direct Rambus DRAM (DRDRAM) 16. A memory such as DRDRAM 16 may be used for program and data storage for MPUs 152. DRDRAM 16 may also be used to store display lists and/or vertex texture maps.

Media processor 14 may also include interfaces to other functional components of graphics system 112. For example, media processor 14 may have an interface to another specialized processor such as hardware accelerator 18. In the illustrated embodiment, controller 160 includes an accelerated port path that allows media processor 14 to control hardware accelerator 18. Media processor 14 may also include a direct interface, such as bus interface unit (BIU) 154, which provides a direct port path to memory 16 and to hardware accelerator 18 and video output processor 24 via controller 160.

Figure 5:
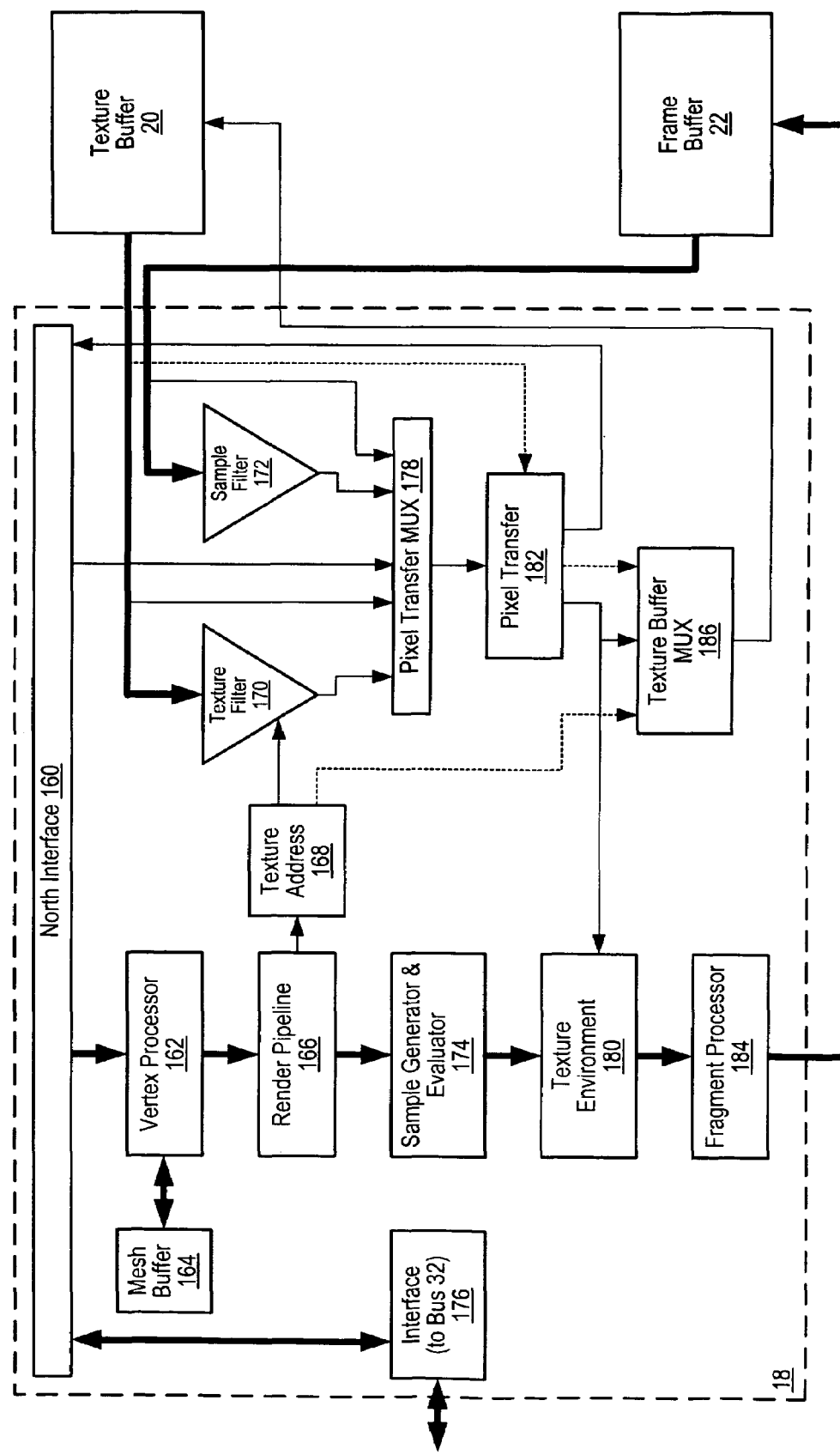
FIG. 5 is a functional block diagram of one embodiment of the hardware accelerator of FIG. 3.

Hardware Accelerator—FIG. 5

One or more hardware accelerators 18 may be configured to receive graphics instructions and data from media processor 14 and then to perform a number of functions on the received data according to the received instructions. For example, hardware accelerator 18 may be configured to perform rasterization, 2D or 3D texturing, pixel transfers, imaging, fragment processing, clipping, depth cueing, transparency processing, set-up, and/or screen space rendering of various graphics primitives occurring within the graphics data. Each of these features is described separately below.

Clipping refers to the elimination of graphics primitives or portions of graphics primitives that lie outside of a 3D view volume in world space. The 3D view volume may represent that portion of world space that is visible to a virtual observer (or virtual camera) situated in world space. For example, the view volume may be a solid truncated pyramid generated by a 2D view window and a viewpoint located in world space. The solid truncated pyramid may be imagined as the union of all rays emanating from the viewpoint and passing through the view window. The viewpoint may represent the world space location of the virtual observer. In most cases, primitives or portions of primitives that lie outside the 3D view volume are not currently visible and may be eliminated from further processing. Primitives or portions of primitives that lie inside the 3D view volume are candidates for projection onto the 2D view window.

Set-up refers to mapping primitives to a three-dimensional viewport. This involves translating and transforming the objects from their original "world-coordinate" system to the established viewport's coordinates. This creates the correct perspective for three-dimensional objects displayed on the screen.

Screen-space rendering refers to the calculation performed to generate the data used to form each pixel that will be displayed. For example, hardware accelerator 18 may calculate "samples." Samples are points have color information but no real area. Samples allow hardware accelerator 18 to "super-sample," or calculate more than one sample per pixel. Super-sampling may result in a higher quality image.

Hardware accelerator 18 may also include several interfaces. For example, in the illustrated embodiment, hardware accelerator 18 has four interfaces. Hardware accelerator 18 has an interface 160 (referred to as the "North Interface") to communicate with media processor 14. Hardware accelerator 18 may also be configured to receive commands from media processor 14 through this interface. Additionally, hardware accelerator 18 may include an interface 176 to bus 32. Bus 32 may connect hardware accelerator 18 to boot PROM 30 and/or video output processor 24. Boot PROM 30 may be configured to store system initialization data and/or control code for frame buffer 22. Hardware accelerator 18 may also include an interface to a texture buffer 20. For example, hardware accelerator 18 may interface to texture buffer 20 using an eight-way interleaved texel bus that allows hardware accelerator 18 to read from and write to texture buffer 20. Hardware accelerator 18 may also interface to a frame buffer 22. For example, hardware accelerator 18 may be configured to read from and/or write to frame buffer 22 using a four-way interleaved pixel bus.

The vertex processor 162 may be configured to use the vertex tags received from the media processor 14 to perform ordered assembly of the vertex data from the MPUs 152. Vertices may be saved in and/or retrieved from a mesh buffer 164.

The render pipeline 166 may be configured to receive vertices and convert them to fragments. The render pipeline 166 may be configured to rasterize 2D window system primitives (e.g., dots, fonts, Bresenham lines, polygons, rectangles, fast fills, and BLITs (Bit Block Transfers, which move a rectangular block of bits from main memory into display memory, which may speed the display of moving objects on screen)) and 3D primitives (e.g., smooth and large dots, smooth and wide DDA (Digital Differential Analyzer) lines, triangles, polygons, and fast clear) into pixel fragments. The render pipeline 166 may be configured to handle full-screen size primitives, to calculate plane and edge slopes, and to interpolate data down to pixel tile resolution using interpolants or components such as r, g, b (i.e., red, green, and blue vertex color); r2, g2, b2 (i.e., red, green, and blue specular color from lit textures); a (alpha); and z, s, t, r, and w (texture components).

In embodiments using supersampling, the sample generator 174 may be configured to generate samples from the fragments output by the render pipeline 166 and to determine which samples are inside the rasterization edge. Sample positions may be defined in loadable tables to enable stochastic sampling patterns.

Hardware accelerator 18 may be configured to write textured fragments from 3D primitives to frame buffer 22. The render pipeline 166 may send pixel tiles defining r, s, t and w to the texture address unit 168. The texture address unit 168 may determine the set of neighboring texels that are addressed by the fragment(s), as well as the interpolation coefficients for the texture filter, and write texels to the texture buffer 20. The texture buffer 20 may be interleaved to obtain as many neighboring texels as possible in each clock. The texture filter 170 may perform bilinear, trilinear or quadlinear interpolation. The pixel transfer unit 182 may also scale and bias and/or lookup texels. The texture environment 180 may apply texels to samples produced by the sample generator 174. The texture environment 180 may also be used to perform geometric transformations on images (e.g., bilinear scale, rotate, flip) as well as to perform other image filtering operations on texture buffer image data (e.g., bicubic scale and convolutions).

In the illustrated embodiment, the pixel transfer MUX 178 controls the input to the pixel transfer unit 182. The pixel transfer unit 182 may selectively unpack pixel data received via north interface 160, select channels from either the frame buffer 22 or the texture buffer 20, or select data received from the texture filter 170 or sample filter 172.

The pixel transfer unit 182 may be used to perform scale, bias, and/or color matrix operations, color lookup operations, histogram operations, accumulation operations, normalization operations, and/or min/max functions. Depending on the source of and operations performed on the processed data, the pixel transfer unit 182 may then output the data to the texture buffer 20 (via the texture buffer MUX 186), the frame buffer 22 (via the texture environment unit 180 and the fragment processor 184), or to the host (via north interface 160). For example, in one embodiment, when the pixel transfer unit 182 receives pixel data from the host via the pixel transfer MUX 178, the pixel transfer unit 182 may be used to perform a scale and bias or color matrix operation, followed by a color lookup or histogram operation, followed by a min/max function. The pixel transfer unit 182 may then output data to either the texture buffer 20 or the frame buffer 22.

Fragment processor 184 may be used to perform standard fragment processing operations such as the OpenGL fragment processing operations. For example, the fragment processor 184 may be configured to perform the following operations: fog, area pattern, scissor, alpha/color test, ownership test (WID), stencil test, depth test, alpha blends or logic ops (ROP), plane masking, buffer selection, pick hit/occlusion detection, and/or auxiliary clipping in order to accelerate overlapping windows.

Texture Buffer—20

Texture buffer 20 may include several SDRAMs. Texture buffer 20 may be configured to store texture maps, image processing buffers, and accumulation buffers for hardware accelerator 18. Texture buffer 20 may have many different capacities (e.g., depending on the type of SDRAM included in texture buffer 20). In some embodiments, each pair of SDRAMs may be independently row and column addressable.

Frame Buffer 22

Figure 6:
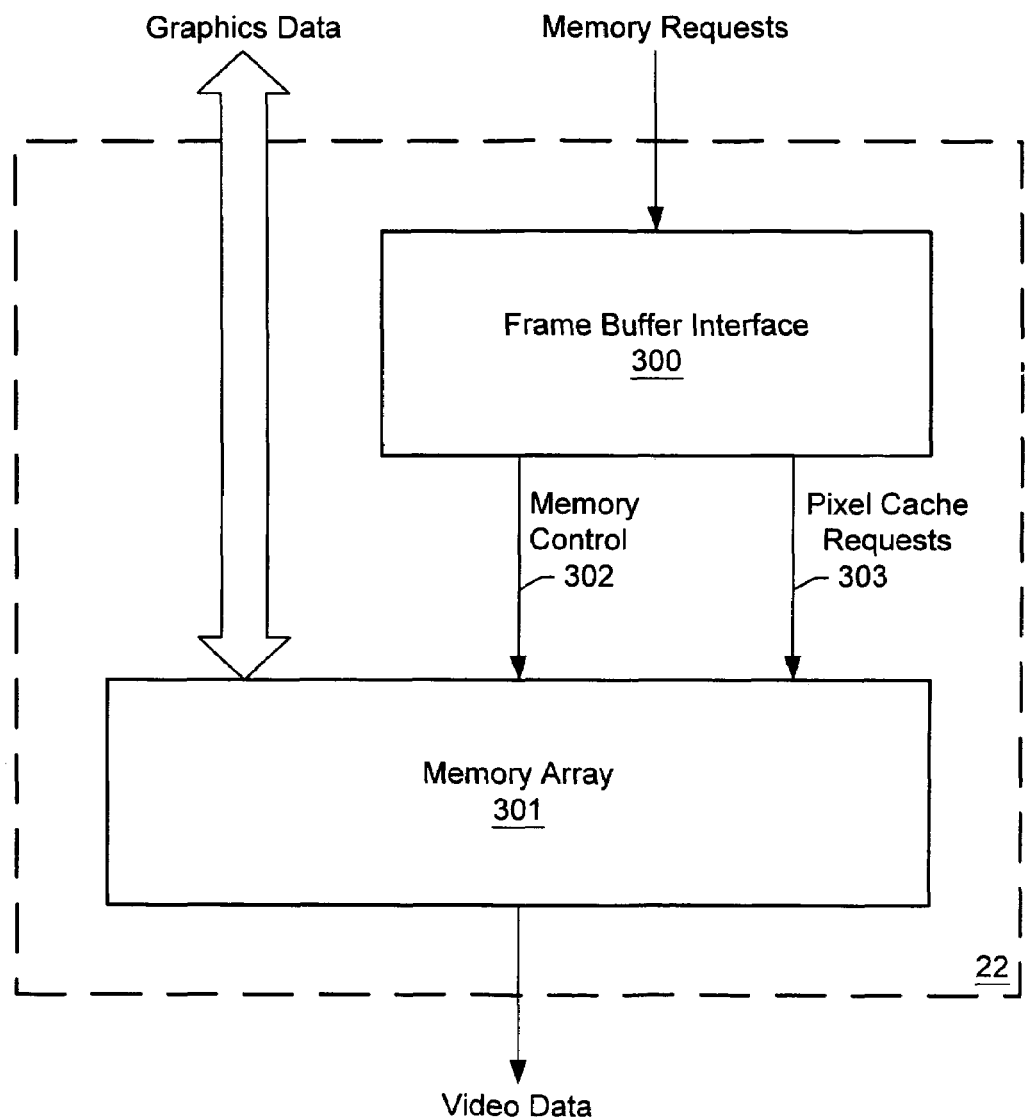
FIG. 6 is a simplified block diagram of one embodiment of the frame buffer of FIG. 3.

One or more frame buffers 22 may be configured to receive and store data samples from hardware accelerator 18. In one embodiment, the frame buffer 22 may take the form illustrated in FIG. 6. In this example, the frame buffer interface 300 may be configured to receive requests and data from the fragment processor 184. These requests may be for the storage, retrieval, or manipulation of pixel data. In processing these requests, the frame buffer interface may determine what portion of the memory array 301 contains the requested data, test for cache hits, and schedule requests to the memory array 301, in addition to other functions as explained in greater detail below.

The memory array 301 may be configured to receive controls from the frame buffer interface 300. In response to these controls, the memory array 301 may perform data storage and retrieval, fetches, cache write-backs, and other operations. Pixel data may be transferred bi-directionally between the memory array 301 and the fragment processor 184 either as individual pixels or tiles of pixels (i.e., an array of neighboring pixels). The memory array 301 may also be further configured to output a continuous stream of pixels to the video processor 24.

Figure 7:
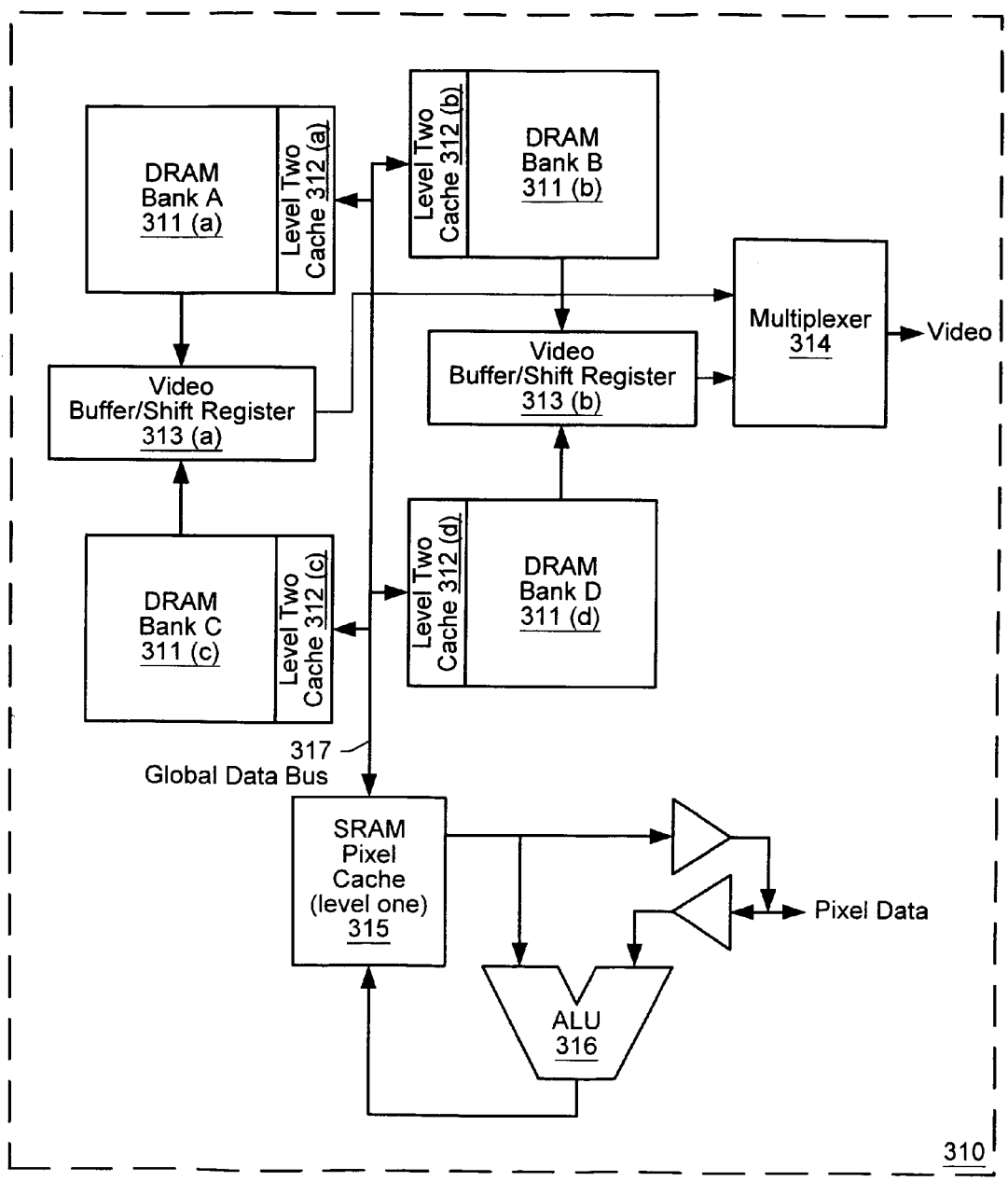
FIG. 7 is a functional block diagram of one embodiment of a 3D-RAM device.

In one embodiment, the memory array 301 may employ one or more 3D-RAM 310 memory devices. Turning now to FIG. 7, a simplified block diagram of one possible 3D-RAM configuration is illustrated. The total storage capacity of the device may be divided equally among four DRAM banks 311. Each bank may be further subdivided into a number of pages that represent the smallest unit of data in a DRAM bank 311 which may be accessed directly. All four DRAM banks 311 respond to a common page address to form a page group.

To facilitate accessing pixel data within a page, each DRAM bank 311 may be furnished with a level two cache 312. In this example, the level two cache 312 is sized appropriately to hold one entire page of data and may in some cases be referred to as a "page buffer". Hence, as commands are issued to the 3D-RAM 310 that result in the access of pixels within the DRAM, entire pages are transferred between the DRAM and the level two cache 312. In some embodiments, this level two cache may be configured as a write-through cache (i.e., as data is written to the cache, the data is also written through to the DRAM).

Each page of storage may be further subdivided into blocks that represent the smallest unit of data that may be transferred between the level two cache 312 and the SRAM pixel cache 315 (described in detail below). In this example, the global data bus 317 is connected to the level two cache 312 and the SRAM pixel cache 315 and is sized appropriately to allow for the parallel transfer of an entire block of pixels. The global data bus 317 is bi-directional and transfers blocks of data from the level two cache 312 to the SRAM pixel cache 315 during block fetches, and in the opposite direction while performing cache write-backs.

The SRAM pixel cache 315 may constitute a level one cache memory, configured so that a single cache tag entry corresponds to a block of pixel data. In this configuration, each block in the SRAM pixel cache 315 contains spatially relevant or contiguous pixel data. The blocks themselves, however, may not be contiguous. Additionally, each block of pixels in the SRAM pixel cache 315 may correspond to data stored in one and only one DRAM bank 311.

In one embodiment, the SRAM pixel cache 315 may be a triple ported memory, with one bidirectional port dedicated to the transfer of data between the SRAM and the level two caches 312. The second port may be a dedicated input and receive the output of the arithmetic logic unit (ALU) 316 that is described below. The third port may be a dedicated output that may be utilized to furnish the ALU 316 with an operand, or to communicate pixel data to circuitry outside the 3D-RAM 310.

The ALU 316 receives inbound pixel data communicated from circuitry outside of the 3D-RAM 310 as one operand. The second operand is fetched from a storage location within the SRAM pixel cache 315. The ALU may be configured to implement a number of mathematical functions on the operands in order to effect the combination or blending of new pixel data with data existing in the 3D-RAM 310. An example of one such operation may be a weighted sum, wherein pixel data is weighted and combined according to some level of transparency. The ALU 316 thus allows the 3D-RAM 310 to transform many read-modify-write operations into write-mostly operations.

The 3D-RAM 310 may also be equipped with two video buffer/shift registers 313. These shift registers are configured as parallel-in-serial-out devices, which may be broadside loaded with full or partial display lines of pixel data. The shift registers 313 may then output the data sequentially in response to an external pixel clock. In order to provide for a continuous stream of pixels at the video output, the two shift registers may alternate duty (i.e., one loading data while the other is outputting data). The outputs of the two shift registers may then be combined in to a single stream of video data by a multiplexer 314.

Figure 8:
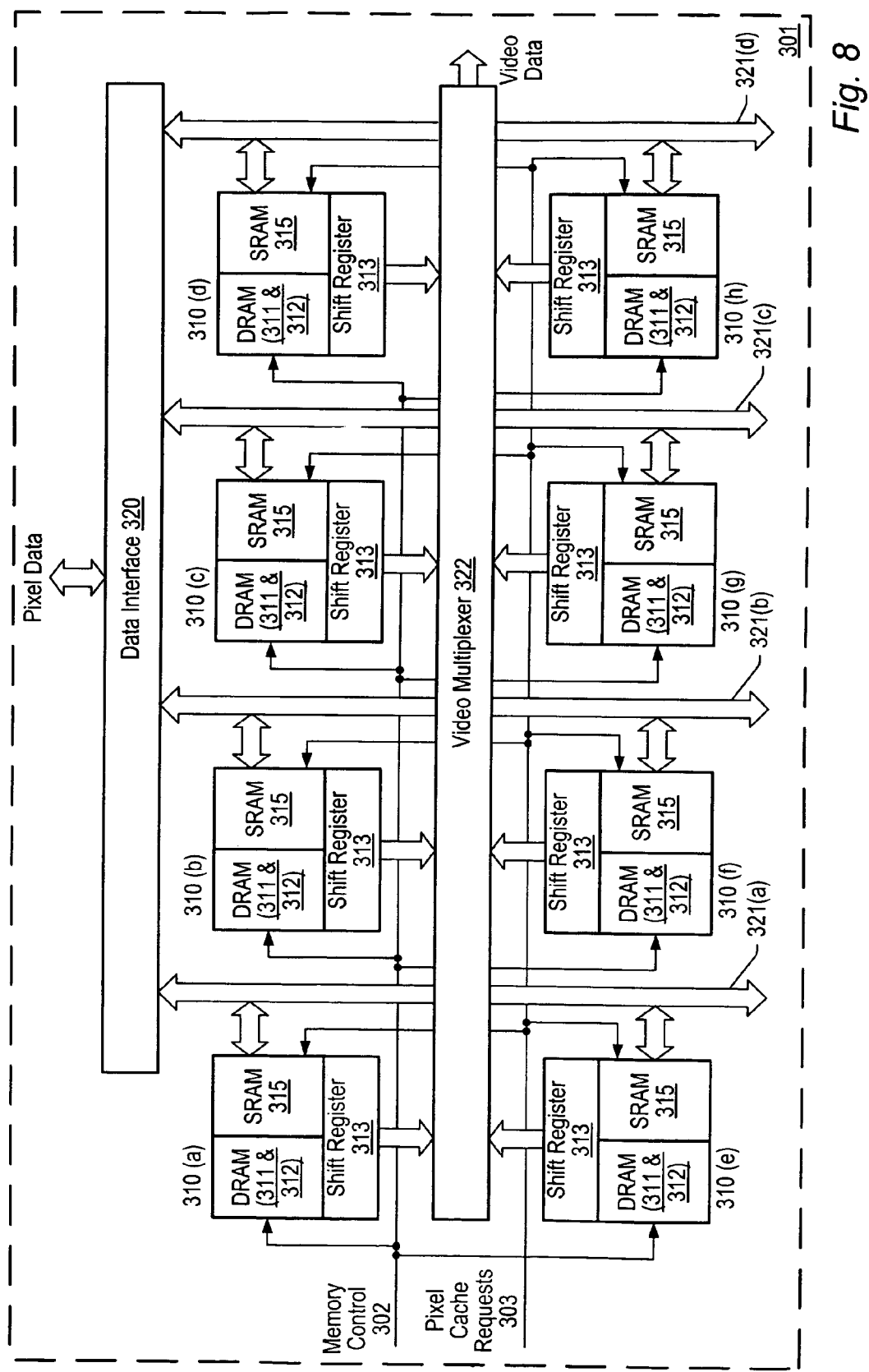
FIG. 8 is a functional block diagram of one embodiment of the memory array of FIG. 6.

Turning now to FIG. 8, one embodiment of the memory array 301 is shown. In this example, 3D-RAM devices 310 are employed, and the array is segmented to facilitate the storage of tiles of pixels or samples. A tile of pixel data is delivered to the bi-directional data interface 320 from the fragment processor 184. Within the data interface 320 the tile may be buffered and the pixels comprising the tile may be reordered to maintain the spatial interrelationship of the pixels. In this embodiment of the memory array 301, the tile is assumed to have four pixels. Consequently, the pixel data leaves the data interface 320 on four bi-directional data buses 321. These data buses 321 divide the memory array 301 into columns of 3D-RAM devices 310.

In this embodiment of the memory array 301, inbound pixel data being stored in the array is written into the SRAM 315 of the 3D-RAM devices 310. As described earlier, this SRAM acts as a level one cache memory. Pixel cache requests 303 are received from the pixel request processor 336 (described in detail below) and may include the target address of the pixel data. Along with the target address, opcodes for ALU 316 may be sent allowing for the arithmetic combination of the pixel data with data already stored in the memory array 301.

In performing some operations (e.g., scaling rendered data to change the effective zoom factor of the displayed image), the hardware accelerator 18 may also request pixel data from the memory array 301. If the requested pixel data is currently residing in the level one cache memory 315, then the pixel request processor 336 issues pixel cache requests 303 to the memory array 301. These requests may include the source address of the data to be retrieved, as well as an indication of which 3D-RAM devices 310 the data is to be found in. The 3D-RAM devices respond by placing the requested data on the data buses 321 where it is delivered to the data interface 320. Within the data interface 320, the pixels may be reordered when recombined into a tile in order to maintain any spatial interrelationships. Once the tile is constructed, the data may be buffered and delivered to the fragment processor 184.

When pixel data that is requested from the memory array 301 is not currently residing in the level one cache 315 (i.e., a level one cache miss), a cache operation may be requested prior to the issuance of any pixel cache requests 303. If the data is determined to be located in the level two cache 312 (i.e., a level two cache hit), then the memory request processor 335 (described in detail below) may request a block transfer by asserting the appropriate memory control signals 302. In this case, a block of memory within the level one cache 315 may be allocated, and a block of pixel data may be transferred from the level two cache 312 to the level one cache 315. After this transfer is completed, the pixel cache requests 303 described above may be issued.

If the requested data is not found in the level two cache (i.e., a level two cache miss), then the memory request processor 335 may request a page fetch by asserting the appropriate memory control signals 302. In this case, an entire page of pixel data is read from the appropriate DRAM bank 311 and deposited in the associated level two cache 312. Once the page fetch is completed, then the block transfer and pixel cache requests 303 described above may be issued.

The 3D-RAM devices 310 may also receive requests for video that cause data to be internally transferred from the appropriate DRAM banks 311 to the shift registers 313. In the embodiment shown, the video streams from all 3D-RAM devices 310 in the array are combined into a single video stream through the use of a multiplexer 322. The output of the multiplexer 322 may then be delivered to the video output processor 24 described in more detail below. In other embodiments of the memory array 301, the video streams from each 3D-RAM may be connected in parallel to form a video bus. In this case, the shift registers 313 may be furnished with output enable controls, where the assertion of an output enable may cause the associated shift register 313 to place data on the video bus.

Figure 9:
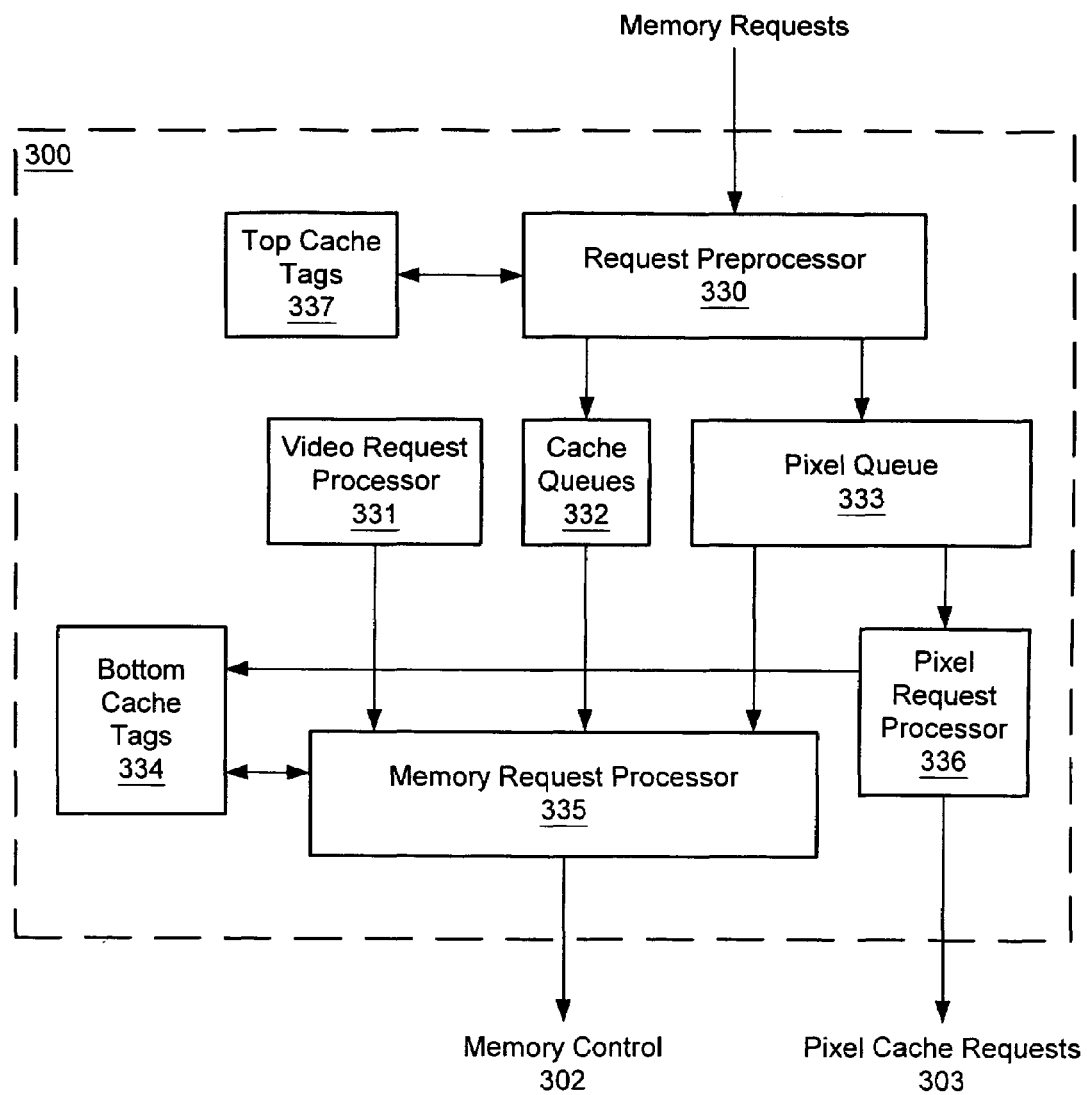
FIG. 9 is a functional block diagram of one embodiment of the frame buffer interface of FIG. 6.

Turning now to FIG. 9, one embodiment of the frame buffer interface 300 is shown. The request preprocessor 330 may be configured to receive requests related to pixels contained in the memory array 301. These requests may represent pixel storage/retrieval, manipulation, fill, or other operations. The submitted request is examined, and the page and block address of the corresponding pixel in the memory array 301 is determined. The request preprocessor 330 may maintain a set of top cache tags 337 for both the level one and the level two caches. These cache tags 337 may represent the current state of the caches, as well as any pending cache requests already in the cache queues 332. The cache tags 337 are examined against the page and block addresses of the targeted pixel for a hit indicating that the pixel is currently cached. If the examination reveals that the pixel is already in the level one cache, then a request may be placed in the pixel queue 333. Otherwise, the miss is evaluated as either a level one or level two miss, and a request to the appropriate cache or caches is placed in the cache queue 332.

In this example, the cache queues 332 are two small queues that may operate in a first-in-first-out (FIFO) mode and may differ in depth. For example, where the queue for the level two cache may be 4 entries deep, the queue for the level one cache may be 8 entries, or twice as large. The cache queues 332 receive queue requests from the request preprocessor 330 and buffers them until the memory request processor 335 is able to service them. Requests placed in the level two cache queue may include an indication of a page address to fetch and a bank from which to fetch the page. Requests placed in the level one cache may be slightly more complicated, including not only a block address, but also an opcode indicating a fetch, fast fill, memory mode change, or other operation to be performed on the cache.

The pixel queue 333 is a small FIFO memory, which may be larger than either of the two cache queues 332. In this example, the pixel queue 333 may be 16 entries deep and logically divided into a pixel address queue and a pixel data queue. The pixel queue 333 receives requests to store, fetch or modify pixels from the request preprocessor 330, and buffers them until the pixel request processor 336 is able to service them.

The memory request processor 335 receives requests from both the cache queues 332 and the pixel queue 333 and issues the appropriate DRAM controls to the memory array 301. The memory request processor 335 maintains a second set of tag lists for the level one and level two caches. Unlike the tag lists that are maintained by the request preprocessor 330, the tag lists within the memory request processor contain only the current state of the two caches. In evaluating the requests from the queues, page and block addresses are checked against the cache tag lists and misses are translated into the appropriate fetch operations.

The memory request processor 335 may also be responsible for cleansing blocks within the SRAM pixel cache 315. Information is maintained within the bottom cache tags 334 which describes the current status of each block of pixel data currently residing in the level one cache 315. The status may include a tag indicating the block is "dirty" (i.e., pixel data within the block has been modified) and an LRU count describing the usage. As described above, the LRU count for a block may be equal to zero if the block has just been accessed and may be equal to the maximum value if the block has not been accessed in several memory operations. The memory request processor 335 may utilize this status information to periodically write back dirty blocks to the level two cache 332 giving priority to blocks that have high LRU counts. In this manner, least recently used blocks are kept clean, and hence kept available for future allocation.

The pixel request processor 336 may be configured to receive requests from the pixel queue 333. In response to these requests, the pixel request processor 336 may issue commands to the memory array 301. These commands at least in part may control the way in which the ALU 316 treats pixel data as the pixel data is routed to the memory for storage. Thus the pixel request processor 336 not only directs pixel movement through the memory, but also the manipulation of these pixels. The pixel request processor 336 may be additionally configured to maintain information related to the most recent instructions issued to the memory array 301, and in this way internally track or predict the progress of pixels through the processing pipeline of the 3D-RAM.

The video request processor 331 may be configured to receive and process requests for video from the memory array 301. These requests may contain information describing the page where the desired data is located, and the display scan line desired. These requests may be formatted and stored until the memory request processor 335 is able to service them. The video request processor 331 may also employ a video request expiration counter. This expiration counter may be configured to determine deadlines for requests issued to the memory array 301 in order to produce an uninterrupted stream of video data. In circumstances where a request is not issued within the allotted time, the video request processor may issue an urgent request for video.

Figure 10:
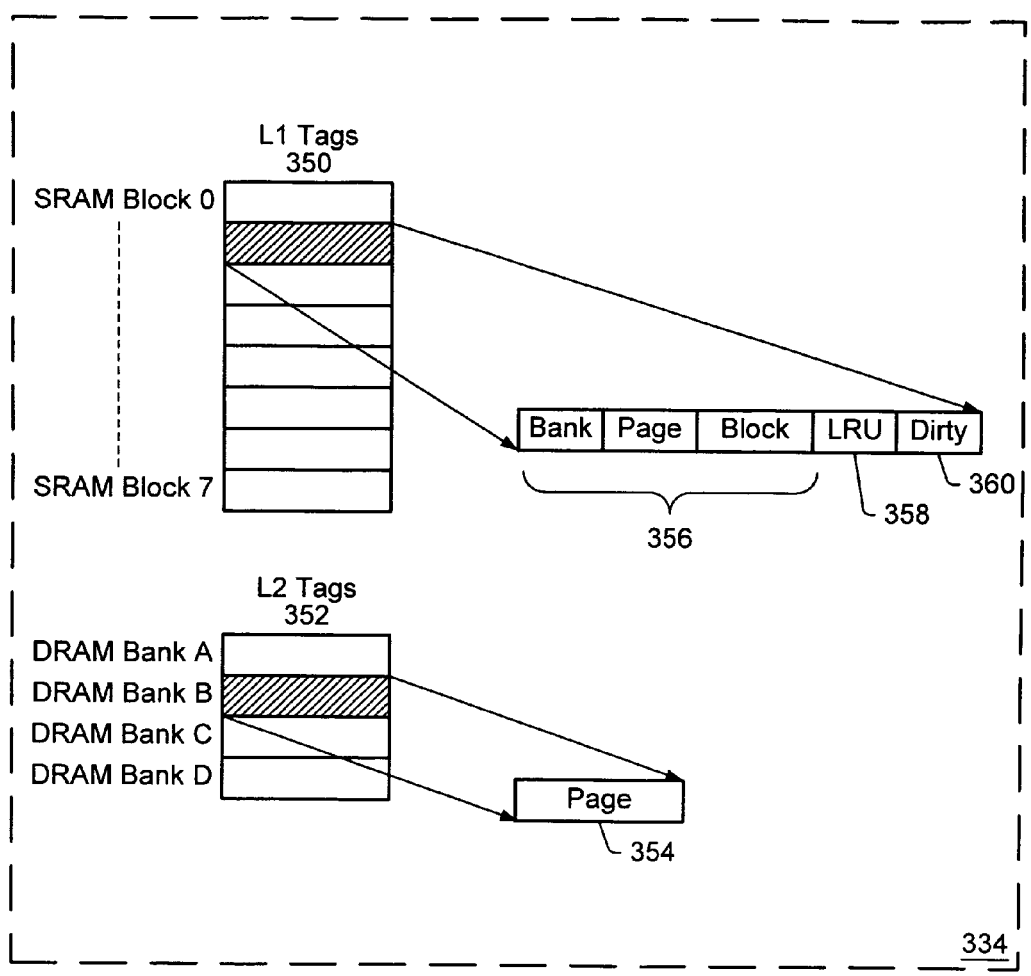
FIG. 10 is a diagrammatic illustration of one embodiment of the bottom cache tags of FIG. 9.

Turning now to FIG. 10, one embodiment of the bottom cache tag 334 structure is illustrated. The bottom cache tags 334 may comprise a set of tags for the level two cache 312 and a separate set for the level one cache 315. The L2 tags 352 associated with the level two cache 312 may contain information 354 regarding the addresses of pages currently cached for each DRAM bank 311. The L1 tags 350 associated with the level one cache 315 may similarly contain information 356 regarding the addresses of blocks currently cached. Additionally, the L1 tags 350 may contain information about individual block usage in the form of an LRU (least recently used) count 358. The information in the LRU count 358 may be used to relativistically determine how recently a particular block has been accessed. In some embodiments, the LRU count 358 may have a minimum value of zero and a maximum value of seven. In this example, a value of zero may indicate that the block has just been accessed whereas a value of seven may indicate that the associated block has not been accessed in several memory operations. The memory request processor 335 may use this information when requesting new block allocations. For example, if a requested pixel is located in a block not currently cached in the level one cache 315, then a block fetch may be issued. Assuming the level one cache 315 is currently full, a block of cache memory will be flushed in order to make room for the new fetch. The decision to flush a block of cache memory may be made in accordance with the associated LRU count 358 (e.g., the most recently used blocks will be kept, whereas the least recently used block may be flushed).

The L1 tags 350 may also contain a dirty tag bit 360. As the memory request processor 335 issues cache requests and the pixel request processor 336 issues pixel requests as described above, the contents of the dirty tag bit 360 may be modified. In this example, a block transfer occurring between a level two cache 312 and a level one cache 315 may cause the dirty tag bit 360 associated with the block to be set to a known state indicating that the pixel data is unmodified. In this case, "unmodified" means that the block of data residing in the level one cache 315 is equivalent to the copy held in the level two cache 312, and hence the same as the original data stored in the associated DRAM bank 311. Conversely, a pixel storage operation may cause the dirty tag bit 360 associated with the affected block to be set to a known state indicating the data is modified. In this case, "modified" means that the indicated pixel data in the level one cache 315 may be different from the copy held in the level two cache 312, and hence different from the original data stored in the associated DRAM bank 311.

Figure 11:
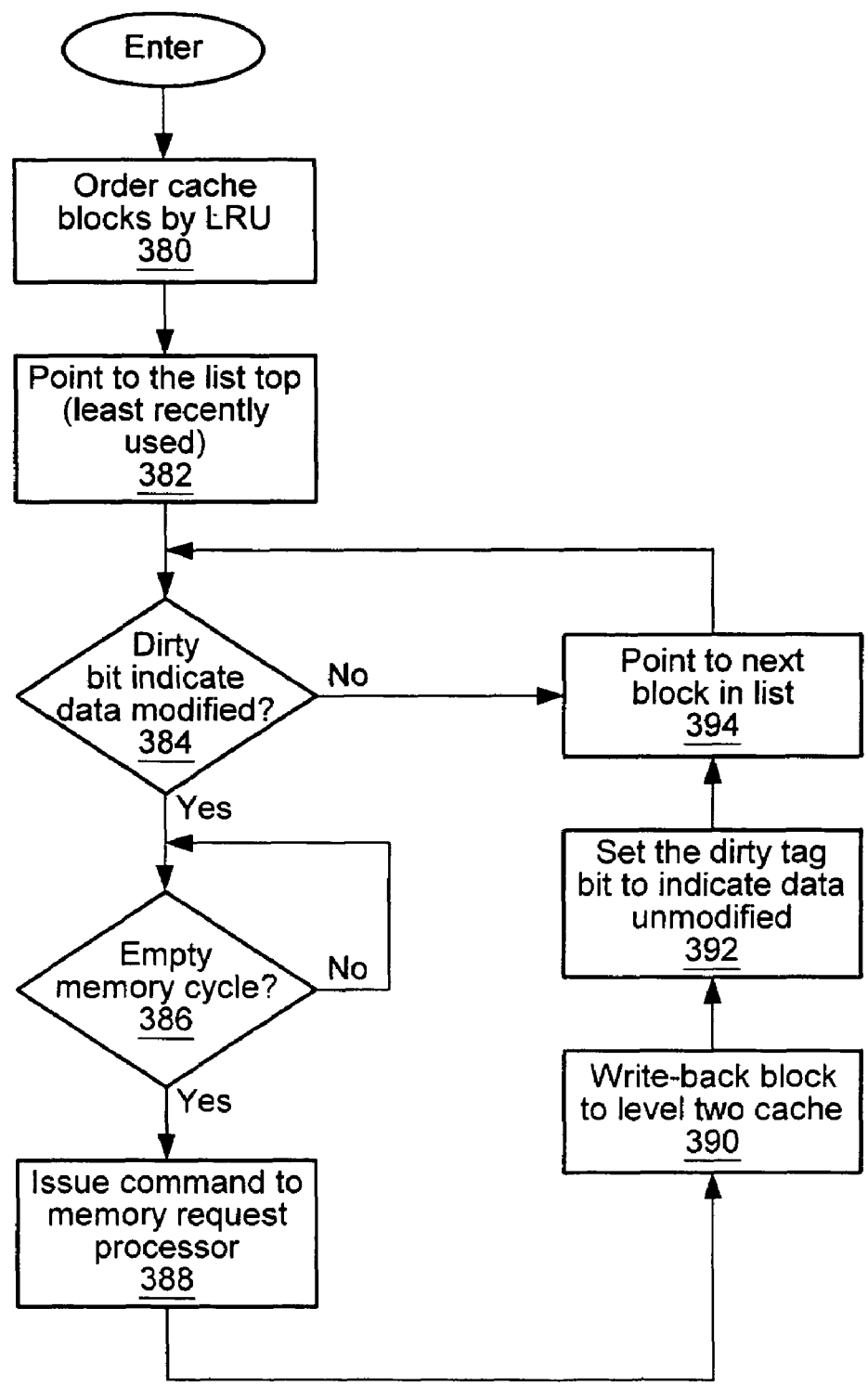
FIG. 11 is a functional block diagram of one embodiment of a method for cleansing blocks of cache memory.

The memory request processor 335 may periodically copy dirty blocks of pixel data in the level one cache 315 to the level two cache 312. Turning now to FIG. 11, a flow diagram representing one embodiment of this "block cleansing" function is illustrated. In this example, the level one cache 315 memory blocks are first ordered according to the associated LRU count 358 (step 380). This ordering may be by descending LRU count 358 meaning the block at the top of the list will have the highest LRU count 358, and hence will represent the block least recently used. Consequently, the block at the bottom of the list will represent the block most recently used. In this embodiment, a pointer may be used to indicate the block currently under examination. The next step may therefore be the initialization of this pointer so that it indicates the block at the top of the list (step 382). Next, the dirty tag bit 360 associated with the block currently under examination is tested (step 384). If the dirty tag bit 360 indicates that the current block is not dirty, then the pointer is made to point to the next block (step 394) and the associated dirty tag bit 360 is tested. Steps 384 and 394 form a loop that steps through the list until a dirty block is found.

Once a dirty block is found, the block cleansing may stall until an empty memory cycle is detected (step 386), at which point a command is issued to the memory request processor 335 (step 388). This command may be a request to copy the current level one cache 315 memory block to the corresponding level two cache 312. In this embodiment, the level two cache 312 is configured as a "write-through" cache. Consequently, as the block is written to the level two cache 312 it is also written through to the associated DRAM bank 311 (step 390). Once the block is successfully transferred, the associated dirty tag bit 360 may be modified to indicate that the block is now clean and available for future allocation (step 392). The next block in the list is then indicated (step 394), and the process is repeated by branching to step 384.

Figure 12:
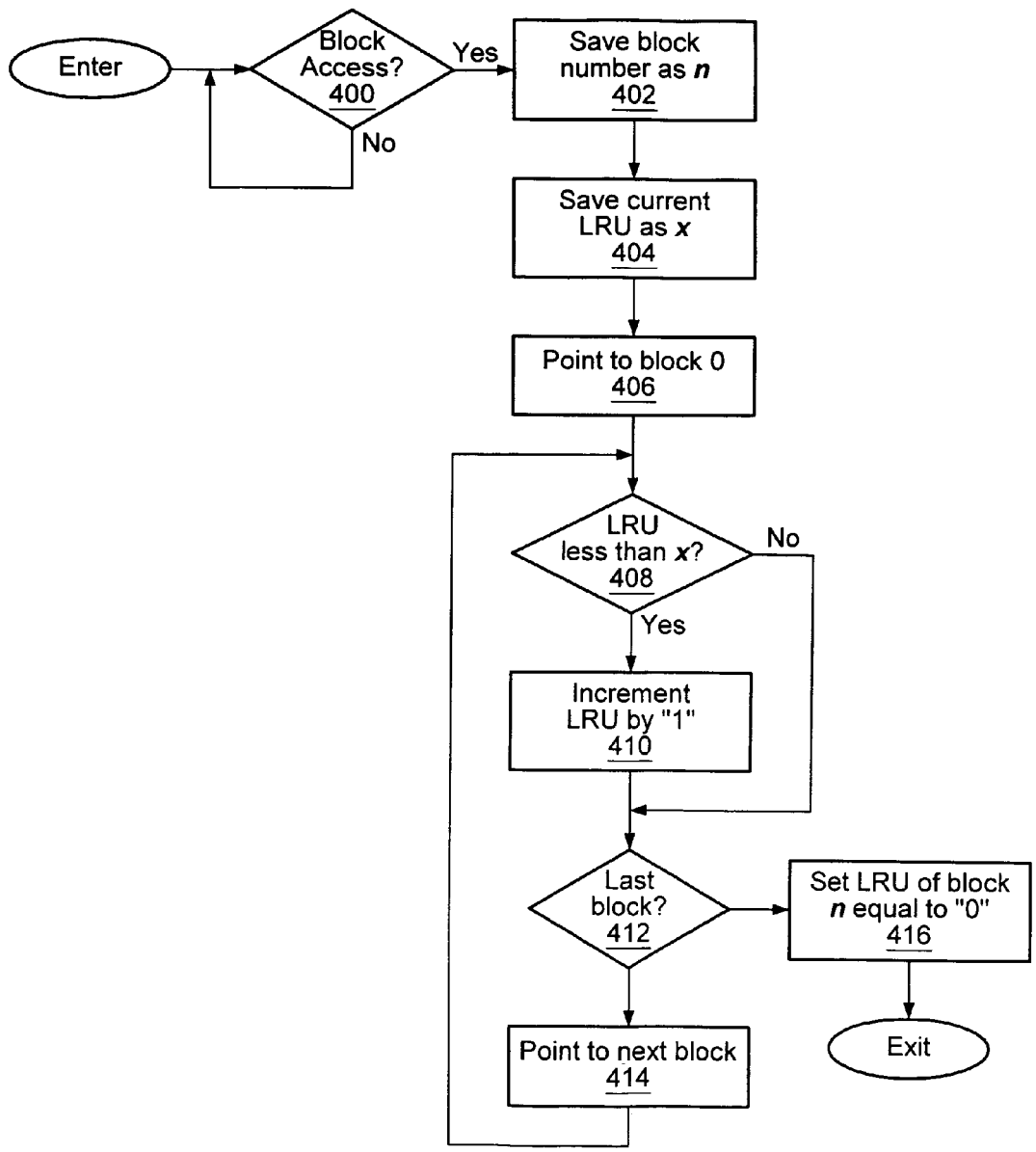
FIG. 12 is a functional block diagram of one embodiment of a method for maintaining LRU counts for cache memory blocks.

Maintaining an LRU count 358 for each block allows the block cleansing function to prioritize blocks as described above. It may also be facilitate the process of selecting blocks to flush when allocation requests are processed. Turning now to FIG. 12, a flow diagram illustrates one embodiment of a method for maintaining an LRU count. The process first waits for an access to a block of level one cache 315 memory (step 400). Once a block access is detected, the number of the block may be saved in variable n (step 402) while the current LRU of the block may be saved in variable x (step 404). Next, each of the L1 tags 350 may be examined by first causing a pointer to indicate the tag corresponding to block 0 (step 406). The L1 tag 350 is retrieved for the block being examined, and the associated LRU 358 is tested against the variable x (step 408). If the LRU 358 of the block being examined is less than x (i.e., the block being examined has been accessed more recently than the block currently being accessed), then the LRU 358 may be incremented by one (step 410). Next, the pointer is tested to determine if each of the L1 tags 350 has been examined. If there are blocks remaining to examine, then the pointer is incremented in order to indicate the next block (step 414) and the examination is repeated by branching to step 408. If however, all of the blocks have been examined, then the LRU 358 of the block currently being accessed may be set to zero (step 416), and the process may be exited.

The method described above relies on the assumption that all LRU counts 358 are initialized to the maximum value prior to any block accesses. An additional constraint of forcing the maximum value of the LRU count 358 to be equal to the number of available blocks minus one may also be imposed. In this case, as the level one cache 315 is filled, the LRU counts 358 of the blocks may become an ordered set with only one least recently used block, and one most recently used block being indicated.

Hence according to the embodiments illustrated above, blocks within the level one cache 315 are kept "clean" (i.e., free of modified pixel data which does not exist also in the level two cache 312 and the DRAM bank 311) through periodic examination and prioritized write-back. These clean blocks are consequently available for future allocations, whereas a lack of clean blocks could potentially result in a stalled data pipeline of a high performance system.

Video Output Processor—FIG. 13

Turning now to FIG. 13, one embodiment of a video output processor 24 is shown for thoroughness. Video output processor 24 may buffer and process pixels output from frame buffer 22. For example, video output processor 24 may be configured to read bursts of pixels from frame buffer 22. Video output processor 24 may also be configured to perform double buffer selection (dbsel) if the frame buffer 22 is double-buffered, overlay transparency (using transparency/overlay unit 190), plane group extraction, gamma correction, pseudocolor or color lookup or bypass, and/or cursor generation. For example, in the illustrated embodiment, the output processor 24 includes WID (Window ID) lookup tables (WLUTs) 192 and gamma and color map lookup tables (GLUTs, CLUTs) 194. In one embodiment, frame buffer 22 may include multiple 3DRAM64s 201 that include the transparency overlay 190 and all or some of the WLUTs 192. Video output processor 24 may also be configured to support two video output streams to two displays using the two independent video raster timing generators 196. For example, one raster (e.g., 196A) may drive a 1280×1024 CRT while the other (e.g., 196B) may drive a NTSC or PAL device with encoded television video.

DAC 202 may operate as the final output stage of graphics system 112. The DAC 202 translates the digital pixel data received from GLUT/CLUTs/Cursor unit 194 into analog video signals that are then sent to a display device. In one embodiment, DAC 202 may be bypassed or omitted completely in order to output digital pixel data in lieu of analog video signals. This may be useful when a display device is based on a digital technology (e.g., an LCD-type display or a digital micro-mirror display).

DAC 202 may be a red-green-blue digital-to-analog converter configured to provide an analog video output to a display device such as a cathode ray tube (CRT) monitor. In one embodiment, RGB DAC 202 may be configured to provide a high resolution RGB analog video output at dot rates of 240 MHz. Similarly, encoder 200 may be configured to supply an encoded video signal to a display. For example, encoder 200 may provide encoded NTSC or PAL video to an S-Video or composite video television monitor or recording device.

In other embodiments, the video output processor 24 may output pixel data to other combinations of displays. For example, by outputting pixel data to two DACs 202 (instead of one DAC 202 and one encoder 200), video output processor 24 may drive two CRTs. Alternately, by using two encoders 200, video output processor 24 may supply appropriate video input to two television monitors. Generally, many different combinations of display devices may be supported by supplying the proper output device and/or converter for that display device.

Although the embodiments above have been described in considerable detail, other versions are possible. Numerous variations and modifications will become apparent to those skilled in the art once the above disclosure is fully appreciated. It is intended that the following claims be interpreted to embrace all such variations and modifications. Note the headings used herein are for organizational purposes only and are not meant to limit the description provided herein or the claims attached hereto.

What is claimed is:

1. A method for write-back of modified graphics data, the method comprising:
   a) ordering a list of data blocks currently in a level one cache by a least recently used value determined for each data block;
   b) setting a pointer to point to a data block at the top of the list, wherein the data block at the top of the list has a largest least recently used value, and wherein a data block currently indicated by the pointer is a current data block;
   c) testing a dirty tag bit corresponding to the current data block, wherein the dirty tag bit indicates whether the data in the block is modified;
   d) setting the pointer to point to a next data block in the list, if the dirty tag bit indicates that the current data block is not modified, and returning to c);
   e) issuing a command to a memory request processor to write-back the current data block from the level one cache to a corresponding level two cache data block, if the dirty tag bit indicates that the current data block is modified;
   f) modifying the dirty tag bit corresponding to the current data block to indicate that the current data block is no longer modified and the memory locations are available for future allocation; and
   g) setting the pointer to point to a next data block in the list, and repeating steps c) through f) for each of the remaining data blocks in the list.

2. The method of claim 1, further comprising determining a least recently used value for each data block in the level one cache prior to a).

3. The method of claim 1, further comprising re-determining a least recently used value for each data block in the level one cache after the data block has been accessed.

4. The method of claim 1, further comprising stalling e) until an empty memory cycle is detected.

5. The method of claim 4, wherein said empty memory cycle is detected on each buss connected to the level one cache and also on each buss connected to a level two cache with a data block corresponding to the current data block.

6. The method of claim 4, wherein said stalling is ignored in response to an urgent request for allocation of memory within the temporary storage space.

7. The method of claim 1, wherein the level two cache is configured as a write-through cache, and as the current data block is written to the level two cache, it is also written to an associated DRAM memory bank connected to the level two cache.

8. The method of claim 1, wherein the modified graphics data is sample data, and wherein a set of sample data is filtered to determine color values for a corresponding pixel.

9. The method of claim 1, wherein the set of sample data includes sample data for samples located within a filter region corresponding to a location of the corresponding pixel.

10. The method of claim 1, wherein the least recently active value determined for each data block is based on how recently the data block was accessed.

11. The method of claim 1, wherein an arithmetic logic unit connected to the level one cache memory is configured for:
   receiving as a first operand graphics data from a source external to the memory;
   receiving as a second operand graphics data stored in the level one cache; combining arithmetically the two operands according to a function defined by an external control signal; and
   storing the resulting modified graphics data in the level one cache.

12. The method of claim 1, wherein a) through g) are repeated periodically.

13. The method of claim 1, wherein a) through g) are repeated continuously.

14. A graphics system comprising:
   one or more memories configured to receive and store graphics data, wherein each memory comprises, on a single integrated chip:
      one or more RAM memories configured to store the graphics data;
      a level two cache connected to each RAM memory; and
      a level one cache connected to each of the level two cache memories;
   an array of registers for each of the one or more memories configured to store status information, wherein the status information indicates, for each block of memory in the corresponding level one cache, whether the graphics data is modified or unmodified and a least recently used value; and
   a memory interface connected to the one or more memories and to the array of registers, wherein the memory interface is operable to:
      a) store a list of data blocks currently in the level one cache;
      b) order the list by the least recently used values for each data block;
      c) set a pointer to point to a data block at the top of the list, said pointer thereby identifying a current data block;
      d) copy graphics data from the current data block to a corresponding level two cache data block if the status information for the current data block indicates the graphics data is modified;
      e) reset the pointer to point to a next data block in the list, if the status information indicates the current data block is not modified, and return to d);
      f) modify the status information corresponding to the current data block to indicate that the current data block is no longer modified and the memory locations are available for future allocation; and
      g) reset the pointer to point to a next data block in the list, and repeat d) through g) for each of the remaining data blocks in the list.

15. The graphics system of claim 14, further comprising a set of busses connected to the level one and level two caches, wherein the memory interface is further operable to stall said copy graphics data until an empty memory cycle is detected on each of the busses connected to the level one cache and the level two cache with the corresponding data block.

16. The graphics system of claim 14, wherein the data block at the top of the list has a largest least recently used value.

17. The graphics system of claim 14, wherein the array of registers stores status information indicative of the current state of each level one cache plus the predicted results of one or more memory requests pending in the request queue, and wherein the least recently used values reflect the pending memory requests.

18. The graphics system of claim 14, wherein each memory further comprises a shift register connected to each RAM, wherein each shift register is configured to receive and store portions of the graphics data from each RAM, and wherein each shift register is further configured to output graphics data serially in response to an external clock signal.

19. The graphics system of claim 14, further comprising a video processor and a display device, wherein the display device displays images according to the video data generated by video processor from the graphics data.

20. The graphics system of claim 14, wherein each memory further comprises an arithmetic logic unit connected to the level one cache memory and configured to:
- receive as a first operand graphics data from a source external to the memory;
- receive as a second operand graphics data stored in the level one cache;
- arithmetically combine the two operands according to a function defined by an external control signal; and
- store the results of the arithmetic combination in the level one cache.

* * * * *